United States Patent [19]

Macleod

[11] Patent Number: 4,667,137
[45] Date of Patent: May 19, 1987

[54] SINGLE EXCITATION PULSE BRUSHLESS DC MOTOR

[75] Inventor: Donald J. Macleod, Santa Cruz, Calif.

[73] Assignee: Applied Motion Products, Inc., Scotts Valley, Calif.

[21] Appl. No.: 719,970

[22] Filed: Apr. 4, 1985

[51] Int. Cl.$^4$ ............................................. H02K 29/08
[52] U.S. Cl. ..................................... 318/254; 318/138; 318/439; 310/68 R
[58] Field of Search ................. 318/138, 254 A, 254, 318/439; 310/46, 68 R, 154, 156, 181

[56] References Cited

U.S. PATENT DOCUMENTS

| | | | |
|---|---|---|---|
| 3,242,404 | 3/1966 | Favre | 318/138 |
| 4,233,532 | 11/1980 | Esters | 310/46 |
| 4,376,261 | 3/1983 | Heide et al. | 318/254 |
| 4,429,263 | 1/1984 | Muller | 318/254 |
| 4,430,603 | 2/1984 | Muller | 318/254 |
| 4,496,887 | 1/1985 | Ichihara et al. | 318/254 |
| 4,499,407 | 2/1985 | Macleod | 318/254 |
| 4,563,622 | 1/1986 | Deavers et al. | 318/254 |

FOREIGN PATENT DOCUMENTS

| | | | |
|---|---|---|---|
| 55-155570 | 12/1980 | Japan | 318/138 |
| 58-63069 | 4/1983 | Japan | 310/46 |
| 58-119760 | 7/1983 | Japan | 310/181 |
| 0363084 | 8/1962 | Switzerland | 310/181 |
| 0748702 | 7/1980 | U.S.S.R. | 318/254 |
| 0860230 | 8/1981 | U.S.S.R. | 310/46 |

Primary Examiner—William M. Shoop, Jr.
Assistant Examiner—Bentsu Ro
Attorney, Agent, or Firm—Michael J. Hughes

[57] ABSTRACT

A single excitation phase pulse brushless DC motor (10) including a rotor portion (12) mounted upon a shaft subassembly (14) and rotating therewith with respect to a stator portion (16). The rotor portion (12) includes a first zone of steady state magnetization in the form of a main field magnet (24) divided into radially polarized sectors (26). The stator portion (16) includes the main stator stack (34) upon which the stator windings (38) are placed and a second zone of steady state magnetization in the form of a permanent disk magnet (46). The disk magnet (46) is divided into radially polarized sectors (48) similarly to those of the field magnet (24). A hall effect senior (40) is also provided to act as a commutator triggering element. The motor (10) is characterized in that the opposition of the first and second steady state zones of magnetization provides a steady state torque curve which urges the rotor (12) to rotate with respect to the stator (16) when it is in certain rotational positions. A current through the stator winding (38) overcomes the steady state torques at other positions and causes, upon properly timed activation, continuous rotation of the rotor (12). The primary usage of the motor (10) is in high speed, low cost fans and in magnetic media disk drives.

9 Claims, 7 Drawing Figures

SINGLE EXCITATION PULSE BRUSHLESS DC MOTOR

TECHNICAL FIELD

The present invention relates generally to electrical motors and more particularly to brushless direct current (DC) electrical motors. The predominant current usage of the improved brushless DC motor assembly of the present invention is as a replacement for conventional brushless DC motors in various devices including those utilized in magnetic media disk drives in the data processing industry.

BACKGROUND ART

Continually rotating electrical motor have a great variety of uses, many of them occurring within the data processing industry. One of the most significant of these uses is in magnetic media disk drives, some of them being used for flexible of "floppy" disk drives and some being utilized in hard, fixed or "Winchester" disk drives. The type of performance required for these utilizations is high speed rotation with extremely steady performance. The motors should be capable of starting readily and achieving an equilibrium running state in a short time.

Once all of the above characteristics have been achieved, improvements in the motors can be accomplished by cutting the cost of manufacture, simplifying the necessary associated circuitry and reducing the size of the motors, among other possibilities. Improvements have been made in various aspects, including improving the start-up capabilities of the motor. A prior art motor which shows enhanced start-up capabilities and is otherwise typical of the construction of brushless DC motors is found in the Inventor's prior patent entitled "Brushless DC Motor Assembly With Improved Stator Pole", U.S. Pat. No. 4,499,407.

Other examples of brushless DC motors incorporating conventional structures and associated circuitry may be found in U.S. Pat. No. 4,430,603, issued to Muller and U.S. Pat. No. 4,376,261 issued to von der Heide et al.

One of the most common forms of brushless DC motors in the prior art is the three phase bipolar excitation type of motor. Another is the two phase unipolar excitation type.

The three phase bipolar version is popular since it provides high performance characteristics. However, in addition to relatively complex commutation logic and circuitry, this type of motor requires three separate stator windings and six switching devices to achieve proper motor control.

The two phase unipolar excitation type motor, an example of which may be found in U.S. Pat. No. 4,429,263, issued to Muller, has long been thought to be the simplest form of operable motor. This type of motor requires two separate stator windings and two switching devices, plus a position sensor and commutation logic and circuitry.

With each effective type of brushless DC motor the goal is to achieve an array wherein, regardless of the position of the rotor with respect to the stator during rotation, a positive torque is generated. This has been accomplished in the above motors by the multiple windings and switching devices, with the appropriate ones being activated depending on rotor position.

All of the prior art brushless DC motors within the inventor's knowledge have utilized at least two excitation pulses per pair of poles per rotation or else have required some variety of mechanical initiation of rotation. An example of a motor using a single excitation pulse but an external mechanical rotation initiator is found in the standard high school laboratory project wherein a bar magnet is rotatably mounted within an armature coil having commutating brushes to switch the polarity of the current in the armature coil. As those skilled in the art will recall, this sort of motor will spin happily once it has started but the ordinary method of initiating rotation is to manually spin the magnet within the armature upon initiation. This is required because there are dead spots, or zero torque zones, wherein the application of current will not cause the motor to initiate rotation. Obviously, the requirement of a manual rotational initiation step is not desirable in an enclosed motor within an operational device.

No prior art DC motor to the inventor's knowledge has successfully utilized brushless multipole technology with a single excitation phase pulse or a single switching device. All successful applications to date have used more complex electrical structures or have required additional external rotational impetus.

DISCLOSURE OF INVENTION

Accordingly, it is an object of the present invention to provide a brushless DC motor which may be continually operated utilizing only a single excitation pulse per pair of poles per rotation of the rotor.

It is another object of the present invention to provide an electrically simplified brushless DC motor.

It is a further object of the invention to provide a brushless DC motor which requires only a single open/-closed switching device for operation.

It is still another object of the present invention to provide a simplified DC motor which is physically similar to and can replace prior art DC motors.

This invention relates to a brushless DC motor having conventionally formed stator and rotor elements but being provided with an additional source of steady state magnetization such that only a single excitation pulse per pair of magnetic poles is required to cause a complete rotation of the rotor shaft. The present invention is particularly adapted for any use in which conventional brushless Dc motors are utilized.

Briefly, the preferred embodiment of the present invention is a single excitation phase pulse brushless DC motor for use in providing continuous constant speed rotational motion to various elements. One of the primary uses for a motor of this sort is in magnetic media disk drives in the data processing industry, particularly with regard to Winchester type disk drives. The brushless DC motor includes a rotor portion which rotates with respect to a stator portion. In the preferred embodiment the rotor portion includes cylindrical main field magnet which is divided into four radially polarized sectors of equivalent size and shape. These sectors are alternately radially polarized to be magnetically polarized radially inward and radially outward. The stator portion includes four stator poles which are wound with electrical leads such that when a current is delivered through the electrical leads a radially oriented magnetic field, opposite in adjacent poles, is generated in the stator poles. These stator poles radially oppose the rotor poles and the interaction of the magnetic fields therein causes rotation of the motor. A position sensor, ordinarily in the form of a hall effect sensor, serves the same purpose as commutator brushes in a standard motor. A signal from the hall effect sensor causes the activation and deactivation of the current within the stator windings.

In the preferred embodiment the axial extent of the rotor main field magnet exceeds the axial overlap with the stator poles. Therefore, a portion of the rotor magnet does not directly physically oppose the stator poles. In the preferred embodiment a second steady state magnet is mounted within the motor at a position axially displaced from the stator poles but within the opposition range of the main field rotor magnet. This second steady state magnet also includes four poles to oppose the four rotor poles and is also alternately axially polarized.

When the embodiment is utilized the magnitude of the magnetic field generated by the stator steady state magnetic zone (the second, or stationary magnet) is selected to be one half of that generated by the application of current through the stator windings and of opposite polarity. The motor then operates by the selective excitation of the stator windings, creating a magnetic field which is double the strength of that of the stationary second magnet of opposingly polarized. This results in the effect of the steady state magnetization being overcome and essentially reversed during excitation. The net result is that during those intervals when the stator is not activated by a current in the windings a magnetic pattern is generated by the steady state zone alone. On the other hand, when the stator is activated the exact reverse magnetic pattern obtains due to the opposing double magnitude induced poles. Switching the stator activation on and off thus results in alternation of equally powerful, oppositely arrayed magnetic fields to be created opposing the poles of the rotor magnet. This causes the rotor to spin with respect to the stator.

The second zone of steady state magnetization may either be in the form of a permanent magnet or in the form of a steady state electrically induced stator pole structure created by a continuous current being delivered through the windings to generate the steady state magnetization.

An equally preferred alternate embodiment does not utilize an additional element external to the stator stack but rather places a second winding on the stator poles. This winding will be continually energized such that it generates a steady state magnetic field having a polarity opposite to and a field strength equal to half of that generated by the main stator winding when activated. In this case the zone of steady state magnetization is spatially congruent with the stator poles. The steady state field remains on even during stator activation, but since it is of lesser magnitude, the steady state field will be overcome by the activation of the main winding. The utilization of this method eliminates the requirement that the rotor magnets extend axially beyond the zone of juxtaposition with the stator poles. It is also possible to utilize a permanently magnetized stator stack to accomplish to same result.

An advantage of the present invention is that only a single switchable stator winding is required and the current need only be delivered through such winding in a single direction, thus simplifying the structure from that of the prior art.

Another advantage of the present invention is that the external switching circuitry and devices can be significantly simplified, thus lowering cost.

A further advantage is that only a single two-position switching device is required.

Yet another possible advantage of the present invention is that the use of a single excitation pulse per pair of stator poles may provide potential for higher speed rotation.

These and other objects and advantages of the present invention will become clear to those skilled in the art in view of the description of the best presently known modes of carrying out the invention and the industrial applicability of the preferred embodiments as described herein and as illustrated in the several figures of the drawings.

BEST MODE FOR CARRYING OUT INVENTION

The best presently known mode for carrying out the invention is a brushless DC motor constructed such that only a single excitation pulse is required per pair of poles per revolution of the rotor. The motor has simplified circuitry and construction as opposed to brushless DC motors conventionally utilized but may be utilized to replace any of the conventional motors. The predominant expected usage of the inventive motor is in the data processing industry, particularly in magnetic media disk drives wherein the provision of constant high speed rotation is desirable.

Figure 1:
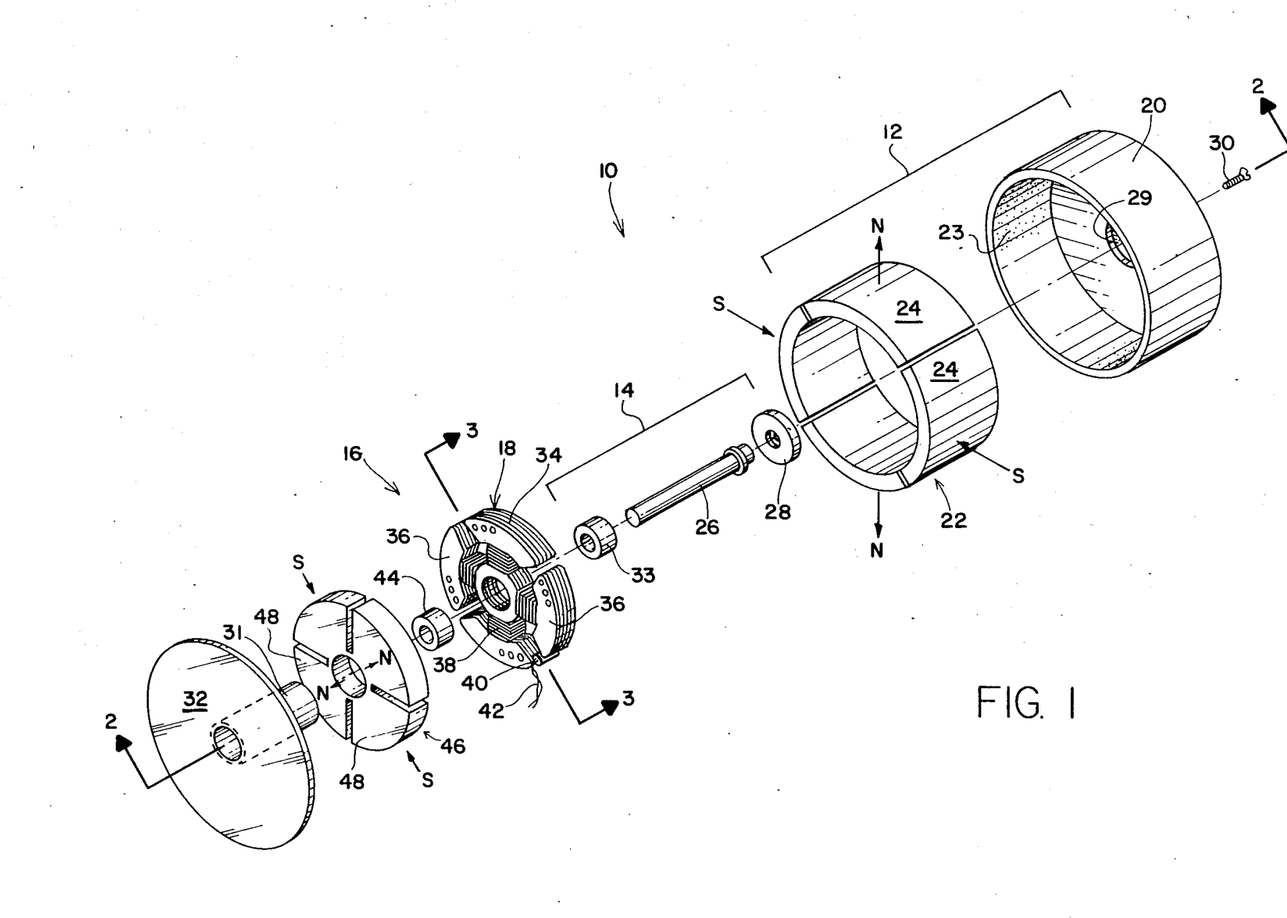
FIG. 1 is an exploded perspective view of a single excitation phase pulse brushless direct current electrical motor according to the present invention.

The single excitation pulse brushless DC motor of the presently preferred embodiment present invention is illustrated in an exploded perspective view in FIG. 1 and is designated therein by the general reference character 10. In most of its substantial components, the motor 10 does not differ significantly from conventional brushless DC motors. The physical structure is similar to that of prior art motors such as that illustrated and described in the inventor's prior patent, U.S. Pat. No. 4,499,407.

The conventional elements of the motor 10 include a rotor assembly 12, a drive shaft assembly 14 and a stator assembly 16 including a stator stack 18 as its major component. The rotor assembly 12 is affixed to the drive shaft 14 and rotates about the axis of the drive shaft. The stator assembly 16 remains stationary with respect to the rotor assembly 12 and the drive shaft 14 but is mounted so as to be coaxial therewith.

The rotor assembly 12 includes a rotor shell 20, also sometimes referred to as a rotor cap. The rotor shell 20 is in the form of a squat cylindrical shell being enclosed at one end and open at the other end. A rotor main field magnet assembly 22 is secured to the interior surface of the rotor shell 20 by an adhesive 23. The rotor magnet assembly 22 includes four distinct rotor poles 24. The rotor poles 24 are radially polarized with adjacent poles 24 being polarized in opposite directions such that one will be radially polarized magnetically south while the adjacent poles will be radially polarized magnetically north, as shown in FIG. 1. The rotor poles 24 are typically permanent magnets having magnetic field strength selected dependent on the required force output of the motor. The rotor magnet 22 may be integrally constructed with pole sectors 24 formed therein or may be an aggregation of distinctly formed pole elements 24, as shown.

One embodiment of the drive shaft assembly 14 includes a rigid cylindrical shaft member 26 which mates with a mounting plate 28 for fitting inside a corresponding mounting depression 29 within the rotor shell 20. The shaft member 26 and the mounting plate 28 are secured in place by a mounting screw 30 which extends through the rotor shell 20 into a threaded end of the shaft member 26. It may be preferable, however, in order to reduce cost, to replace the shaft assembly 24 with a single, plain shaft which is press fit or bonded to the rotor shell 20.

The stator assembly 16 generally refers to those elements which remain stationary with respect to the rotor assembly 12 and the shaft assembly 14. A mechanism for causing the stator stack 18 to remain stationary with respect to the rotating shaft member 26 is the incorporation of a stator post 31 which is secured to a motor base plate 32 (see FIGS. 2 and 5). The base plate 32 is of any of a wide variety of designs and may indeed be the frame of whatever component the motor is being utilized to power. The entire stator assembly 16 is affixed to the stator post 31 to provide a stationary anchoring location. The stator post 31 is hollow and an aperture is provided in the base plate 32 to allow passage of the shaft 26. A mounting bearing 33 is provided within the stator post 31 to facilitate the rotation of the shaft 26.

Figure 3:
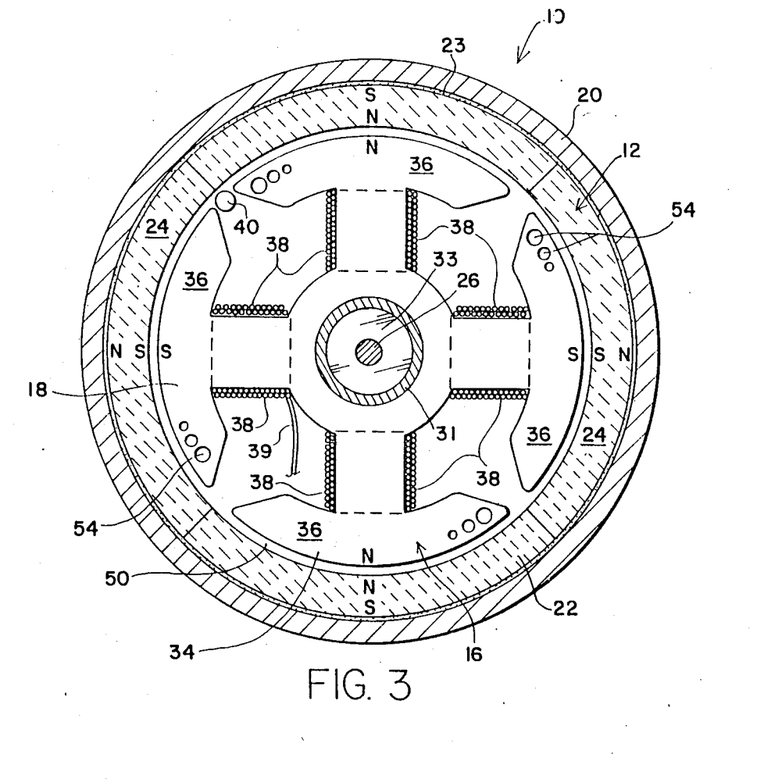
FIG. 3 is a cross-sectional view, taken along line 3—3 of FIG. 1 (or, similarly, line 3—3 of FIG. 2) illustrating the radial positioning of the motor elements.

The stator stack 18, itself, is predominantly made up of a laminated series of plates bonded together to form an element known as a lam stack 34. The lam stack 34 is shaped as shown in FIG. 3 and is divided into four stator pole portions 36. The material of the lam stack 34 in the preferred embodiment is electrically conductive and magnetically permeable but not permanently magnetic. Silicon steel is a preferred material. Each of the stator poles 36 is wound with a stator winding 38, as illustrated in FIG. 3. The stator winding 38 is connected to an external current source by a stator winding lead 39 such that it may be provided with a current running through the stator windings 38. Depending upon the direction of current in the windings 38 and the precise direction in which the windings are wound about the stator poles 36, the generation of a current within the windings 38 induces a magnetic field within each of the poles 36. The winding 38 is wound about each adjacent stator pole 36 in an opposite manner such that when current is delivered through the stator windings 38 the adjacent stator poles 36 will generate opposingly radially polarized magnetic fields. As is more clearly shown in FIG. 3, when the current is activated, opposite stator poles 36 will be radially polarized in a magnetically north direction while the adjacent poles will be radially polarized in a magnetically south direction.

Around the periphery of the stator stack 18 there are gaps between the adjacent stator poles 36 (see FIG. 3). The space within these gaps is magnetically neutral since the poles are opposingly polarized on either side. Within one of these gaps, and adjacent to the air gap, is provided a hall effect sensor 40. The hall effect sensor 40 is a conventional device which is adapted to sense a change in the magnetic polarity which passes opposite it. The purpose of the hall effects sensor 40 is to generate a signal whenever a different one of the rotor magnetic poles 24 passes opposite the sensor 40. The signal generated by the hall effect sensor 40 is delivered by a hall effect sensor lead 42 to the external control circuitry for the motor, illustrated in FIG. 4.

In addition to the conventional elements described above, the motor 10 includes a magnet mounting bearing 44 which is also mounted upon the shaft member 26 at a position axially displaced from the stator stack 18. The magnet mounting bearing 44 exists within the stator post 31 at a position near the mounting of a stationary disk magnet 46 on the stator post 31. The stationary disk magnet 46 is divided into four stationary permanent poles 48 and represents a second zone of steady state magnetization within the motor 10, the first zone being provided by the rotor magnet 22. Each of the permanent poles 48 is radially magnetized with adjacent poles 48 being alternately polarized in magnetic north and magnetic south directions. Like the main field magnet 22, the stationary permanent disk magnet 46 may either be actually physically divided into the four permanent poles 48 as shown or may be unitarily constructed with the magnetic material dispersed therein in such a manner that the four virtual magnetic poles 48 are created. A ring shaped construction such as that illustrated for the rotor magnet 22 may be used as one alternative to the disk shaped magnet 46 illustrated.

Although the disk magnet 46 is illustrated as being closer to the base plate 32 than the stator 16 it may be desirable to reverse this orientation. Such a reversal would reduce the length of electrical leads and simplify construction.

The positioning of the stationary disk magnet 46 along the stator post 31 is such that the permanent disk magnet 46 is displaced from the stator stack 18 but is still within the cylinder of the main field rotor magnet 22. This relationship is best illustrated in the cross-sectional view of FIG. 2.

Figure 2:
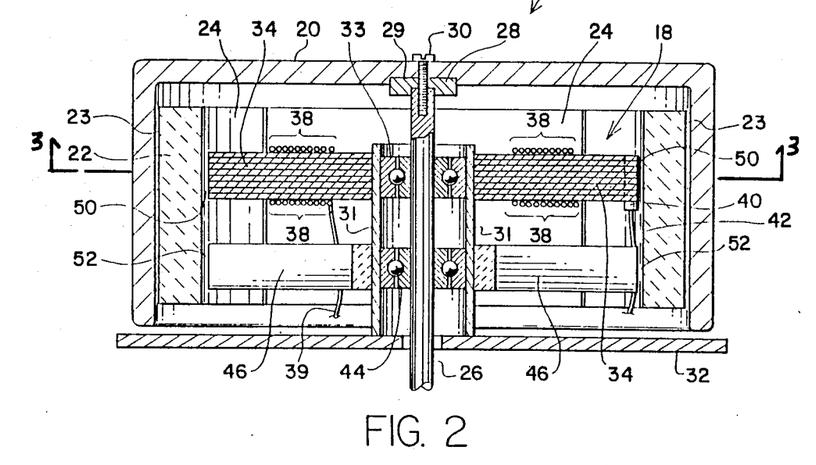
FIG. 2 is a cross-sectional view, after implosion, taken along line 2—2 of FIG. 1, illustrating the relative axial position of the various elements of the preferred embodiment.

FIG. 2 is a cross-sectional view of one preferred embodiment of the single excitation pulse motor 10. In this illustration the axial arrangement of the various elements of the motor 10 may be seen more clearly. The adhesive 23 for mounting the main rotor field magnet 22 to the rotor shell 20 is visible and the mounting depression 29 also appears. The adhesive layer 23 is, for clarity, illustrated as being much thicker than in the actual motor 10. Another element which is more clearly illustrated in this view is the hall effect sensor 40. It may also be seen that the manner in which the stator stack 18 and the main rotor field magnet 22 are aligned permits a stator radial air gap 50 to exist therebetween. The stator radial air gap 50 provides that the rotor may spin freely with respect to the stator 16. However, the distance of separation between the magnetic elements is kept small such that maximum magnetic force is generated therebetween. Similarly, a radial disk magnet gap 52 is formed between the permanent disk magnet 46 and the main rotor field magnet 22.

The motor 10 is illustrated in a cross-sectional view, transverse to that of FIG. 2, in FIG. 3. This illustration shows the radial orientation of the motor elements with respect to one another. It may be particularly seen in this view that the motor elements are essentially radially symmetrical about the central axis of the drive shaft member 26, with the elements being divided into four equivalent sectors, differing only in the polarity of the elements therein. The one exception to this symmetry is the hall effect sensor 40, of which only one is required. The hall effect sensor 40 may be mounted in either of two opposing sector corners or interstices between adjacent stator poles 36 for a given polarity of sensor 40. The polarity of the hall effect sensor 40 and the desired direction of rotation of the rotor assembly 12 determines which interstices are proper for mounting.

FIG. 3 also illustrates the magnetic polarity of the various elements involved. As may be seen by the schematic labelling in the drawing, the various radially polarized sectors 24 of the main rotor field magnet 22 are alternately radially polarized such that adjacent sectors 24 are radially polarized either magnetically south or magnetically north at their interior surface, that is the surface which opposes the stator poles 36. Unless there is current flowing within the stator winding 38, the stator poles 36 will be magnetically neutral and no torque generating magnetic opposition will exist. However, when, as shown in FIG. 3, current flows through the stator winding 38, the illustrated polarization of the stator poles 36 occurs. With the polarity juxtaposition illustrated in FIG. 3 a state of magnetic opposition obtains. This sort of magnetic opposition, with any perturbation, generates torque and causes the rotor 12 to rotate.

In the preferred embodiment, the stator poles 36 have one prong of each pole 36 provided with a series of stator pole apertures 54. These apertures, as shown and described in inventor's U.S. Pat. No. 4,499,407, effectively eliminate zero torque nodes such that there are no positions wherein the rotor can come to a halt where the activation of the stator windings 38 will not cause the initiation of rotation. This is important for the motor to be useful in that it is not usually possible to physically initiate rotation on the motor once it is mounted.

Figure 4:
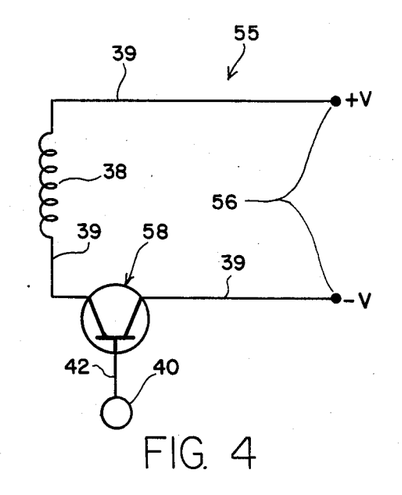
FIG. 4 is a schematic diagram of the external excitation circuitry of the preferred embodiment of the present invention.

A typical array of electrical control circuitry 55 necessary to operate the preferred embodiment of the motor 10 is illustrated in a schematic fashion in FIG. 4. As is illustrated in FIG. 4, the stator winding control circuitry 55 includes the stator winding 38 which is connected via the stator winding leads 39 in a series circuit branch culminating at both ends at a DC power supply 56. A commutator switch 58, shown as a transistor element, is provided within the circuit 55 to selectively open and close the circuit 55, thus generating and truncating the current through the stator winding 38 and consequently generating and truncating the induction of the magnetic field within the stator poles 36. The hall effect sensor 40 generates electrical signals which are delivered through the hall effect sensor lead 42 to the commutator switch 58. The commutator swtich 58 is adapted such that each time a signal is received from the hall effect sensor 40 the commutator switch 58 will change position, either from open to closed or from closed to open. Since the hall effect sensor 40 will generate a signal each time a new one of the radially polarized rotor sectors 24 passes opposite the hall effect sensor 40, the circuit will be closed when one adjacent sector 24 is passing the hall effect sensor 40 and open while the next adjacent sector 24 is in juxtaposition. This control circuitry structure 55 is all that is necessary to operate the motor 10 properly.

Figure 5:
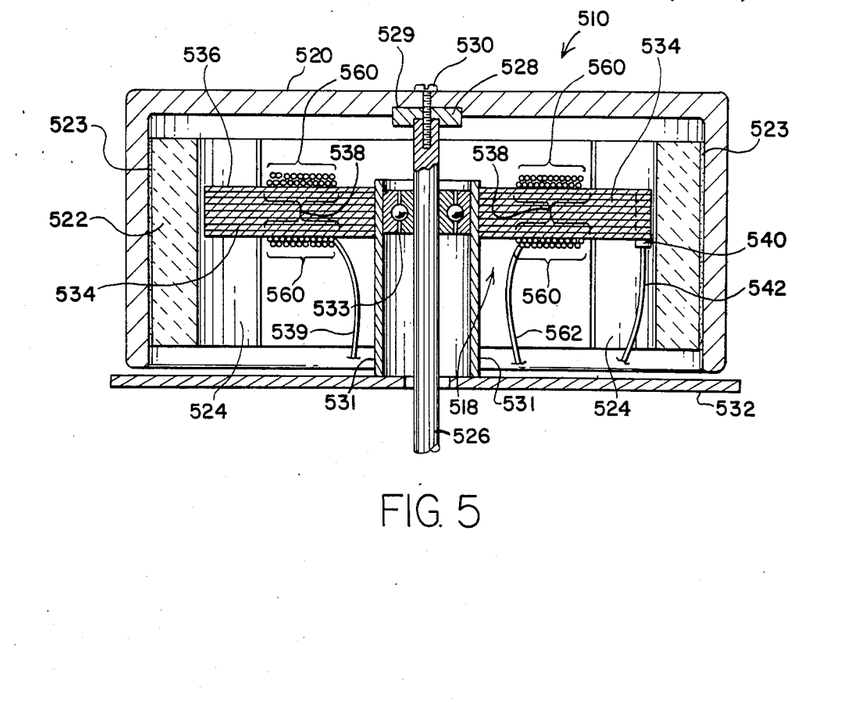
FIG. 5 is a cross-sectional view, similar to that of FIG. 2, showing an alternate preferred embodiment of the present invention.

An alternate preferred embodiment of the present invention is illustrated in FIG. 5, in a cross-sectional view similar to that of FIG. 2. The alternate preferred embodiment, referred to by the general reference character 510, is predominantly extremely similar to the preferred motor 10. For clarity in designating the elements of the alternate embodiment 510, those elements which are common with the preferred embodiment 10 will be designated by the same reference numeral as before except that 500 will be added to the numeral. Therefore, the drive shaft member designated as 26 in FIGS. 1 through 3 is designated in FIG. 5 as reference numeral 526.

The difference between the preferred embodiment 10 and the alternate preferred embodiment 510 lies primarily in the nature of the second zone of steady state magnetization. The purpose served by the stationary disk magnet 46 of the preferred embodiment 10 is differently accomplished. No separate physical element equivalent to the disk magnet 46 is present in the alternate embodiment 510. The alternate embodiment 510 does not include a stationary zone of magnetization which is axially separated from the stator stack 518. Instead, the function of the stationary disk magnet 46 is performed in the alternate embodiment 510 by a steady state stator winding 560 provided about the lam stack 534. The steady state stator winding 560 is connected by a steady state lead 562 to external circuitry (illustrated in FIG. 6) for providing a constant current to the steady state winding 560. In this manner, the constant current flowing through the steady state winding 560 produces a steady state magnetic field in the stator poles 536 which is equivalent to the steady state magnetic field generated by the permanent disk magnet 46 of the preferred embodiment 10.

Although the steady state winding 560 is illustrated in FIG. 5 as being wound on top of the main stator winding 538, this is not a requirement. It is shown in this manner to indicate that a previously existing motor with a single stator winding 538 may be utilized and readily converted, without remanufacture or unwinding, to the alternate embodiment 510 by simply providing an additional winding. An existing motor may be used in this mode without modification if it already has two windings. One winding is simply dedicated to steady state excitation the other is "switched". The inventor is not aware of any reason why the orientations of the two windings may not be reversed or of any effect that would prevent them from being intertwined and wound together. If the same current source is to be utilized for both the main winding 538 and the steady state winding 560, the two windings be wound upon the stator poles 536 in opposite directions such that the direction of magnetic polarization caused by current flow in the windings is opposite. Of course, if the windings are wound in the same direction the same effect can be accomplished by connecting the ends of the windings to opposing poles of the current source. This is more likely since it is easy to wind twin strands in the same direction at the same time.

One potential advantage of the alternate embodiment 510 is that the lack of a necessity for an axially separated zone of steady state magnetization permits the motor 510 to be axially compressed into a smaller space. This advantage can be important in utilizations wherein space, and particularly height, limitations are present, such as in modern half-height Winchester disk drives. This advantage may be sufficient to cause the alternate embodiment 510 to be preferred, regardless of potential electrical interference side effects which may occur from oppositely flowing current in the two sets of windings at the same time.

Figure 6:
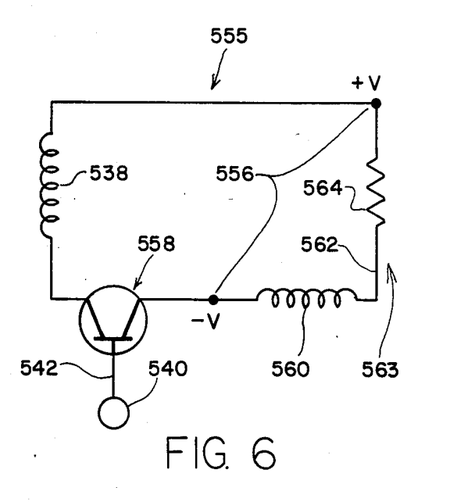
FIG. 6 is a schematic diagram of the external excitation circuitry of the alternate preferred embodiment of FIG. 5.

The external circuitry for use with the alternate embodiment 510 is illustrated in a schematic fashion in FIG. 6. In this illustration it may be seen that all of the elements of the stator control circuitry 55 are also present in the illustration of FIG. 6 and are designated as 555. When the alternate embodiment 510 is utilized, an additional steady state branch 563 of the circuit is provided to activate the steady state stator winding 560. The steady state branch 563, which is independently connected to the power supply 556, includes the steady state stator winding 560, the steady state lead 562 and, optionally, a resistor 564. The purpose of the resistor 564 is to adjust the magnitude of the magnetic field generated in the stator pole 536 during the steady state phase to have a magnitude of one half of that generated when the stator winding 538 is activated. In the illustration of FIG. 6, the same power supply 556 is utilized for both branches of the circuitry so it is necessary to adjust the relative current to yield the two-to-one relationship desired. The resistor 563 may be selected to be variable in order to achieve the proper balance.

Various other similar methods may be utilized to adjust the field strength generated by the steady state winding 560 in the stator poles 536. For example, the number of turns on each pole 536 of the steady state windings 560 may be adjusted or an alternate power supply may be utilized. It may also be desirable to have means on each branch of the circuitry to vary the relative current such that the empirical measurable results of the currents can be adjusted to generate the proper ratio of magnetic fields.

Another embodiment of the invention which is envisioned by the inventor is to replace the lam stack 34 with an element of the same shape but constructed to be both ferromagnetic and electromagnetic material. This may be accomplished by alternately laminating permanently magnetized (preferably non-electrically-conductive) plates with nonmagnetized, conductive plates. The resulting structure, with the ratio of magnetic field strengths as above, combines the stator stack 18 and the stationary zone of state magnetization into the same space. The physical structure will be as shown in FIG. 5 except that no additional winding will be required and the circuitry will be as illustrated in FIG. 4. For this embodiment, it is important that the permanently magnetized portions have a high magnetic hardness such that the magnetization will not be degraded by the stator activation current.

Figure 7:
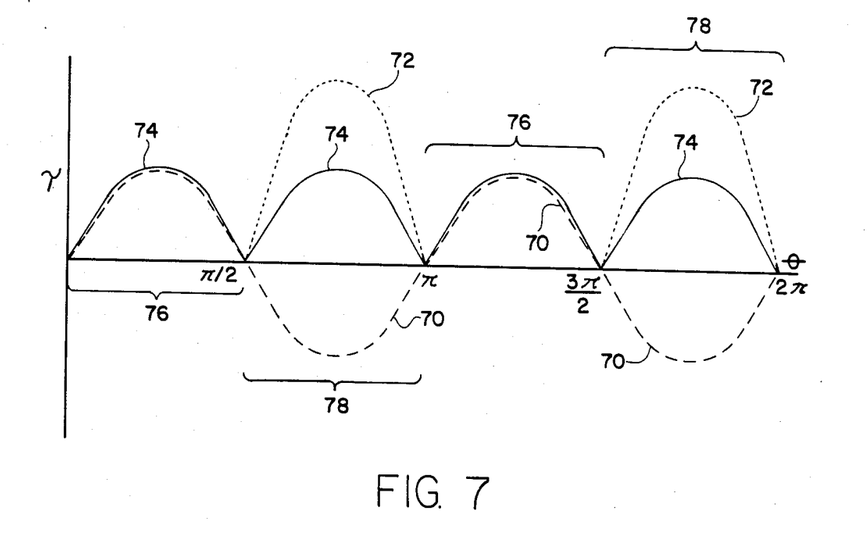
FIG. 7 is a schematic waveform diagram showing the resulting torque generated by the motor of the present invention with respect to rotational position.

The torque-position characteristic of either the preferred embodiment of the motor 10 or the alternate embodiment 510 and other operable four-pole embodiments is illustrated in the schematic diagram of FIG. 7. In this illustration the torque ($\tau$) developed by the motor 10 as a function of position of the rotor ($\theta$) is plotted. Three different curves are shown to illustrate the effects of the various components and operating phases of the motor.

The curve shown as a dashed line and designated by the reference numeral 70 is the trace generated by the interaction of the steady state zone of magnetization with the rotor main field magnet. This trace 70 will remain the same whether the steady state zone of magnetization is in the form of the permanent disk magnet 46 or the steady state magnet generated in the stator poles 536 by providing a constant current through the steady state stator winding 560. The trace 70 is in the form of a sine wave in both embodiments. The y axis represents the magnitude of the torque which is magnetically applied to the rotor shaft 26 while the x axis represents the position of the rotor 12 with respect to the stator 16. Positive and negative torque is established by convention as relating to the direction in which the rotor 12 is urged to rotate ($+\theta$ or $-\theta$). The maximum torque, either positive or negative, is generated when a rotor pole is situated between opposingly polarized adjacent stator (or permanent disk magnet) poles. In this position the rotor pole is being simultaneously repelled by the like pole and attracted by the opposite pole, both forces operating in the same rotational direction. When, on the other hand like poles or opposite poles are juxtaposed there is no force causing the rotor 12 to rotate since equal magnitude attractive or repulsive forces (depending upon alignment) act to keep the rotor in its position. These zero torque positions, or nodes, are represented in FIG. 7 as the points at which the trace 70 intersects the x axis, for a four pole motor occurring at 0, pi/2, pi, etc. radians.

The second trace illustrated, and designated by the general reference numeral 72, illustrates the effect of generating a current through the main stator pole windings 38 and 538. As is illustrated in FIG. 7, this curve is only utilized for two segments or a total of half of the total rotation of the motor. When the motor is operated, the stator windings are activated only during the segment of the rotation wherein the steady state curve 70 shows a negative torque. The relative field strengths of the steady state zone of magnetization and the activatable zone of magnetization created by the stator windings 38 and 538 are selected such that the direction of the curve 72 is opposite to and the magnitude is double that of the steady state curve 70.

The net result during the operation of the motors 10 and 510 is a resultant trace 74 which is a combination of the steady state trace 70 and the activated trace 72. During the segment of rotation between zero and pi/2 radians of rotation, and also during the segment between pi and 3pi/2 radians, designated in the drawing as a non-activated sector 76, the activated trace 72 is non-existent since the commutator switches 58 and 558 are open and no current is delivered to the stator windings 38 and 538. Therefore, the resultant trace 74 is equivalent to the steady state trace 70. In these nonactivated segments or sectors 76, for the purposes of illustration, the traces are shown to be slightly offset. However, in reality they are congruent.

During the two segments of the rotation of the rotor assembly 12 wherein the steady state trace 70 shows a negative torque, designated in the drawings as activated sectors 78, the commutator switches 58 and 558 are closed and a current is generated through the stator windings 38. During these activated segments 78, extending from pi/2 to pi radians and from 3pi/2 to 2pi radians, a magnetic field is generated in the stator poles 36 and 536 and a torque is generated thereby as shown by the activated trace 72. The steady state magnetization will continue to exist and therefore the steady state trace 70 will still be active. However, since the magnitude of the magnetic fields has been selected to accomplish this, the field represented by the activated trace 72 has double the magnitude of that of the opposing steady state trace 70 during the activated interval 78 such that field of the resultant trace 74 has the same shape and magnitude during the activated interval 78 as it does in the non-activated intervals 76. In this manner a positive torque is generated at all stages during the rotation of the motor and continued rotation is maintained. Since the actual motor 10 and 510 are provided with the apertures 54 the actual traces will be offset to prevent true zero torque nodes from occuring. The illustration of FIG. 7 represents an unaltered motor for clarity of explanation.

As is shown above, in great part, the motors 10 and 510 according to the present invention closely resemble prior art conventional motors in their components. The substantial differences exist in the inclusion of a second zone of steady state magnetization, in addition to that provided by the main field magnet 22, and in the alternation of the external control circuitry 55 and 555. No significant changes of materials are envisioned nor are any special constructions required.

It is anticipated that the permanent disk magnet 46 will be of a construction and have properties similar to that of the main rotor field magnet 22 only it may be formed into a disk having a ring-shaped magnetization zone rather than the cylindrical shape of the main field magnet 22. Alternatively, a ring shaped permanent magnet 46, having a radius less than that of the rotor magnet 22, may be substituted. No change is required in the power supplies 56 and 556 and the commutator switch 58 and 558 need only be selected such that it changes phase with each signal from the hall effect sensor 40 and 540. The steady state winding 560 may be substantially identical in form to that of the main stator winding 38, although as stated above, it will be wound in the opposite direction if the same power supply connections are utilized.

Various modifications may be made to the invention without altering its value or scope. For example, the preferred embodiment and the alternate embodiment have been described above in terms of motors in which the main field magnet is situated in the rotor and the windings are on the stator. Although it is probably not commercially feasible, there is no reason that these functions could be interchanged without adversely affecting the improvement created by the present invention. Similarly, the rotor is shown as the exterior member of the motors 10 and 510, but this could easily be altered such that the rotor is the central member and the stator is located around the outside.

Another conceivable change is in the type of polarities utilized. The motors illustrated utilize radial polarities of the magnetic fields to generate the rotation. The concepts described above as being part of the invention would be equally effective in an axially polarized motor. Another element which may be easily changed without affecting the performance of the motor is the number of poles utilized. Since it is the most common motor currently used, the preferred and alternate embodiments have been shown as being four pole motors. However, the substitution of any motor construction having an even number of poles would be effective. For example, a two pole rotor may be utilized opposite a two pole stator with the same results, although the smoothness and continuity of operation would not be as good as with the motors shown.

All of the above are only some of the examples of available embodiments of the present invention. Those skilled in the art will readily observe that numerous other modifications and alterations may be made without departing from the spirit and scope of the invention. Accordingly, the above disclosure is not intended as limiting and the appended claims are to be interpreted as encompassing the entire scope of the invention.

INDUSTRIAL APPLICABILITY

The brushless DC motor is a staple of the data processing industry and is widely used in other fields. It is utilized in any sort of application where it is desirable to provide a constant source of rotation at high speed and at low cost. The predominant current usages are cooling and circulation fans and components included in the construction of disk drives used in computer data storage.

Motors of the present invention may be utilized in any application wherein conventional brushless DC motors are utilized. The main area of improvement is that the external circuitry is simplified and the cost is thereby lowered. In fact, motors according to the alternate preferred embodiment 510 may be created from conventional motors by the simple expedient of providing an additional steady state winding 560 to carry the constant current, and the alteration of the external control circuitry to match that shown in FIG. 6. In fact, in many conventional motors which already have bifilar windings, it will be necessary to modify only the external circuitry to convert the motor to one of the present invention.

The operation of the motors of the present invention results in torque curve such as that shown as trace 74 in FIG. 7. This torque curve results from the use of two steady state zones of magnetization, the first zone of steady state magnetization being the main field magnet of the motor which is always present. The second steady state zone of magnetization, which is added in accordance with the present invention, may be in the form either of a permanent magnet such as that illustrated as permanent disk magnet 46 of FIGS. 1 through 3 or in the form of an additional electromagnetic steady state induced magnet such as that shown as created by winding 560 in FIG. 5. The juxtaposition of the two opposing steady state magnetic fields yields the steady state torque curve 70 of FIG. 7. The activation of the main stator windings 38 and 538, occurring during the activated sectors 78, overcomes the steady state trace 70 and results in a resultant trace 74 having a positive torque during the traverse of the activated sectors 78 as well as in the non-activated sectors 76. The incorporation of some means of providing start-up torque, such as that provided by the stator pole apertures 54, as described in the inventor's prior U.S. Pat. No. 4,499,407 and various patents which have been assigned to the Papst Company of Germany, ensures that the motor will have no zero torque nodes and will be possible to start and run continuously using only a single excitation pulse for each pair of stator poles. The net result is that one excitation pulse, at least, for each pair of poles, per revolution of the rotor, is eliminated by the present invention as compared to the motors presently used.

Since the motors of the present invention may be readily constructed and are physically significantly similar to prior art conventional motors it is expected that they will be acceptable in the industry as substitutes for the conventional motors. The simplified external control circuitry will make the present motors desirable substitutes and will enhance their applicability. For these and other reasons, it is expected that the utility and industrial applicability of the invention will be both significant in scope and long-lasting in duration.

I claim:

1. A single excitation phase pulse direct current electrical motor, comprising:
   a rotor portion and
   a stator portion;
   said motor being characterized by having:
   a first zone of steady state magnetization, said first zone being situated upon the rotor portion, said first zone being radially symmetrical and being divided into n, where n is an even integer, alternating opposingly polarized sectors;
   a second zone of steady state magnetization situated on the stator portion opposite from at least a ring shaped portion of said first zone, said second zone also being divided into n alternating opposingly polarized sectors; and
   induction means including exactly one switching element for selectively inducing a variable zone of magnetization, divided into n alternating opposingly polarized sectors, opposing at least a ring-shaped portion of said first zone, the magnetic field strength of said variable zone, when induced, being approximately twice the magnetic field strength of said second steady state zone such that alternating activation and deactivation of the induction means, depending on the relative positions of the rotor portion and the stator portion, will cause the rotor portion to continually rotate.

2. A single excitation phase pulse direct current electrical motor, comprising:
   a rotor portion and a stator portion having main motor windings; and
   said motor being characterized by having:
   a first zone of steady state magnetization, in the form of main field magnets of the motor, said first zone being situated upon the rotor portion, said first zone being radially symmetrical and being divided into n, where n is an even integer, alternating opposingly polarized sectors;
   a second zone of steady state magnetization, in the form of a permanently magnetized ring, axially offset from the main motor windings, situated on the stator portion opposite from at least a ring shaped portion of said first zone, said second zone also being divided into n alternating opposingly polarized sectors; and;
   induction means including exactly one switching element for selectively inducing a variable zone of magnetization, divided into n alternating opposingly polarized sectors, opposing at least a ring-shaped portion of said first zone, the magnetic fiedl strength of said variable zone, when induced, being greater than the magnetic field strength of said second steady state zone such that alternating activation and deactivation of the induction means, depending on the relative positions of the rotor portion and the stator portion, will cause the rotor portion to continually rotate.

3. A single excitation phase pulse direct current electrical motor, comprising:
   a rotor portion; and
   a stator portion; and
   said motor being characterized by having;
   a first zone of steady state magnetization, in the form of main field magnets of the motor, said first zone being situated upon the rotor portion, said first zone being radially symmetrical and being divided into n, where n is an even integer, alternating opposingly polarized sectors;
   a second zone of steady state magnetization, in the form of a conductive ring being wound with electrical leads carrying constant electrical current such that a steady state magnetic field is generated thereby, situated on the stator portion opposite from at least a ring shaped portion of said first zone, said second zone also being divided into n alternating opposingly polarized sectors; and
   induction means including exactly one switching element for selectively inducing a variable zone of magnetization, divided into n alternating opposingly polarized sectors, opposing at least a ring-shaped portion of said first zone, the magnetic field strength of said variable zone, when induced, being greater than the magnetic field strength of said second steady state zone such that alternating activation and deactivation of the induction means, depending on the relative positions of the rotor portion and the stator portion, will cause the rotor portion to continually rotate.

4. A singled excitation phase pulse direct current electrical motor, comprising:
   a rotor portion; and
   a stator portion including stator poles and stator windings connected to activation circuitry; and
   said motor being characterized by having:
   a first zone of steady state magnetization, in the form of main field magnets of the motor, said first zone being situated upon the rotor portion, said first zone being radially symmetrical and being divided into n, where n is an even integer, alternating opposingly polarized sectors;
   a second zone of steady state magnetization, in the form of a steady state conductive winding, carrying a constant DC current, wound about said stator poles such that the magnetic field generated thereby is polarized oppositely to that generated by activation of current in said stator windings, situated on the stator portion opposite from at least a ring shaped portion of said first zone, said second zone also being divided into n alternating opposingly polarized sectors; and
   induction means including exactly one switching element for selectively inducing a variable zone of magnetization in said stator poles and windings, divided into n alternating opposingly polarized sectors, opposing at least a ring-shaped portion of said first zone, the magnetic field strength of said variable zone, when induced, being greater than the magnetic field strength of said second steady state zone such that alternating activation and deactivation of the induction means, depending on the relative positions of the rotor portion and the stator portion, will cause the rotor portion to continually rotate.

5. The motor of claim 4 wherein:

the magnitude of the magnetic field generated by said variable zone, when activated, is approximately double that generated by said second zone.

6. A simple brushless DC motor, comprising:
a rotor portion including a main field magnet mounted therein, said main field magnet being divided into n, where n is an even integer, alternately radially polarized pole sectors and further including a shaft assembly about which the rotor assembly is concentrically formed;
a stator portion, concentrically formed with respect to said shaft assembly, including n stator poles being separated from said rotor pole sectors by a radial air gap, each said stator pole being wound with a stator winding connected to a power source and control circuitry such that when current is delivered through said stator winding said stator poles are induced to generate radially polarized magnetic stator pole fields, the polarity of said stator pole fields being opposite in adjacent said stator poles; and
a stationary steady state zone of magnetization, situated such that the stationary zone is axially separated from said stator poles and separated by a radial air gap from said rotor pole sectors, the stationary zone being divided into n alternating radially polarized sector poles, with each of said sector poles being radially positioned to be equivalent to a corresponding one of said stator poles, the magnetic field strength generated in each of said sector poles being less than the magnetic stator pole field generated by said corresponding stator pole and the polarity thereof being opposite.

7. The motor of claim 6 wherein:
the stationary zone of steady state magnetization includes conductive pole material wound with a steady state winding through which a constant current is passed.

8. The motor of claim 6 wherein:
the magnitude ratio of said magnetic stator pole field to the field existing about the stationary zone of steady state magnetization is approximately two to one.

9. In a brushless direct current motor including a stator portion having a stator and a stator field, a rotor portion having a rotor with a main field magnet, the improvement comprising:
a steady state zone of magnetization opposing the main field magnet, the magnetic field of the steady state zone being locally opposite to and approximately one-half the magnitude of the field generated by the activation of the stator; and
control circuitry means for activating the stator field only when the position of the rotor is such that a negative torque is generated by the juxtaposition of the magnetic fields generated by the main field magnet and the steady state zone of magnetization.

* * * * *